Sept. 25, 1962

G. KULICK 3,055,371

DEVICE FOR REGULATION AND CONTROL OF
ESOPHAGO-GASTRIC BALLOONS

Filed Dec. 23, 1958

INVENTOR
GEORGE KULICK

BY Cushman, Darby & Cushman
ATTORNEYS

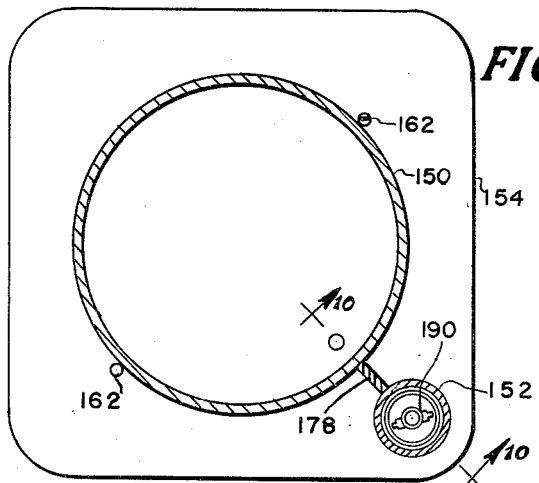
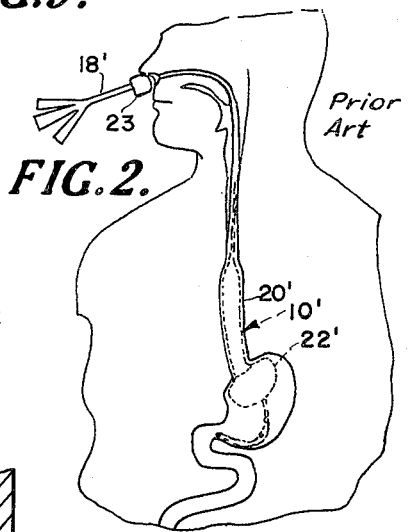
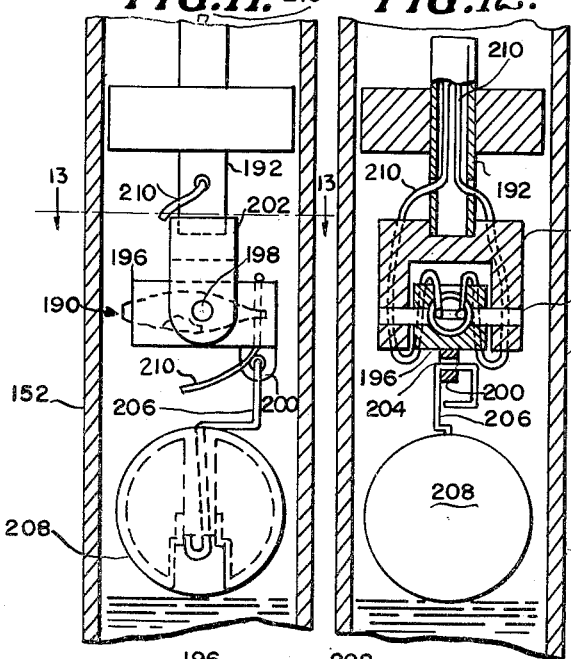
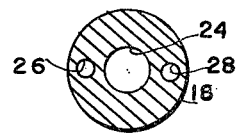
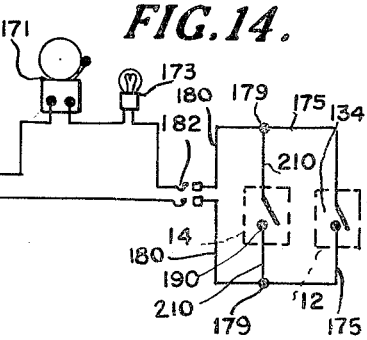
INVENTOR
GEORGE KULICK

INVENTOR
GEORGE KULICK

BY Cushman, Darby & Cushman
ATTORNEYS

Sept. 25, 1962 G. KULICK 3,055,371
DEVICE FOR REGULATION AND CONTROL OF
ESOPHAGO-GASTRIC BALLOONS
Filed Dec. 23, 1958 4 Sheets-Sheet 4
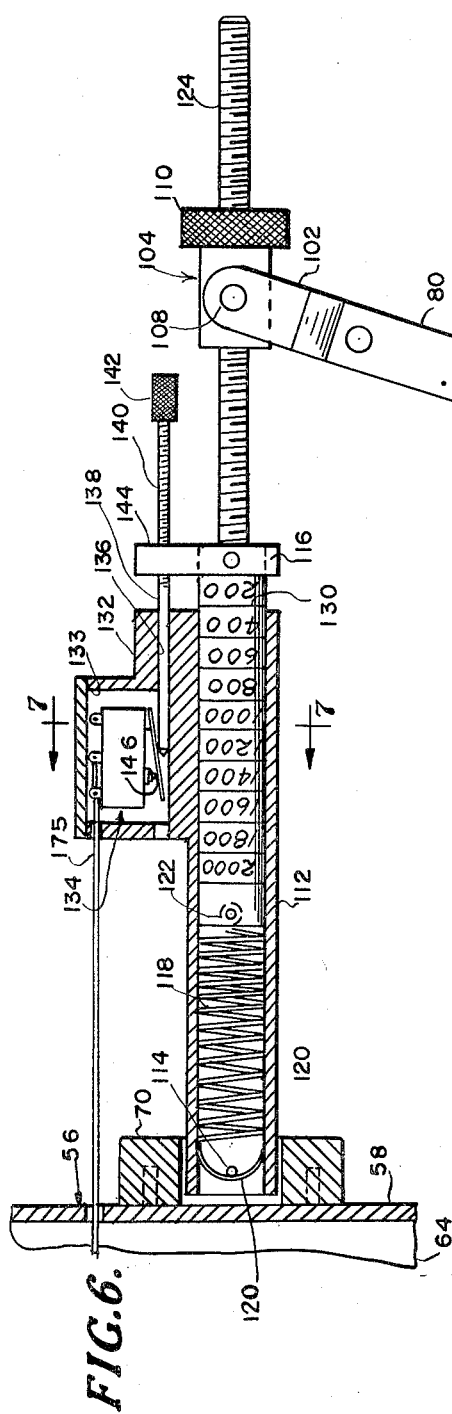
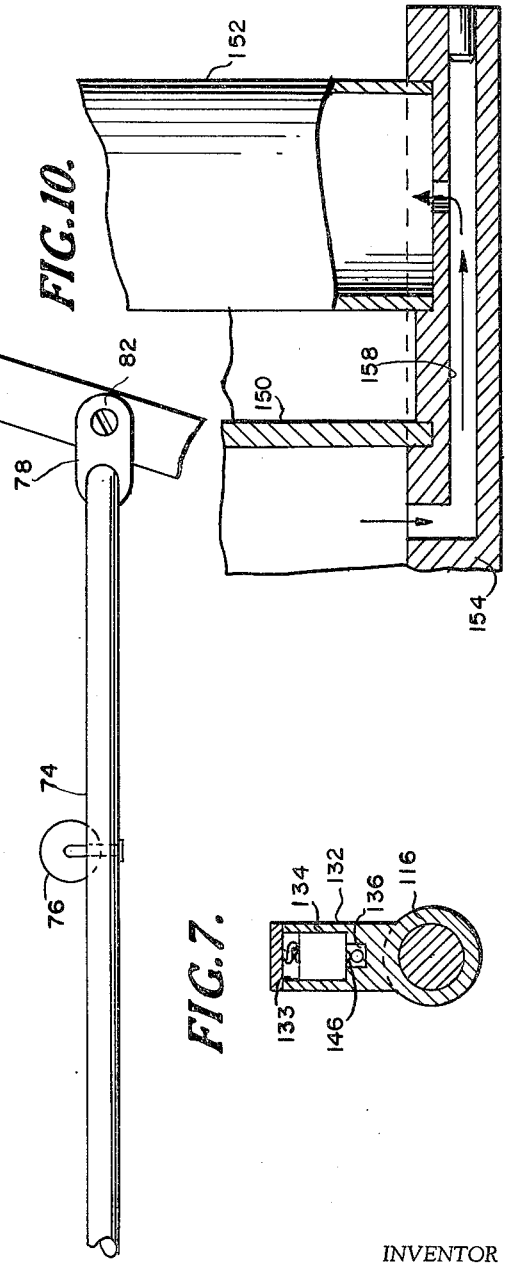
INVENTOR
GEORGE KULICK
BY Cushman, Darby & Cushman
ATTORNEYS

United States Patent Office 3,055,371
Patented Sept. 25, 1962

3,055,371
DEVICE FOR REGULATION AND CONTROL OF ESOPHAGO-GASTRIC BALLOONS
George Kulick, 178 W. 12th St., New York, N.Y.
Filed Dec. 23, 1958, Ser. No. 782,601
28 Claims. (Cl. 128—325)

The present invention relates generally to esophago-gastric treatment systems and, more particularly, to new and novel control devices for esophago-gastric balloons or the like.

The portal system of veins contains the blood returning from the stomach, intestines, colon and spleen. It is then carried through the liver and thence back to the general systemic veins to the heart. When the flow of blood in this portal vein system becomes partially or totally obstructed due to some disease process within or just external to the liver, the blood must return to the heart by way of the many collateral channels of veins that connect the portal system with the general system of veins. The pressure of the blood within this portal system increases to two, three or four times the normal pressure and is designated as "portal hypertension."

The blood, in being forced through these collateral venous channels causes them to become large, tortuous thin-walled varicose veins. Of these many varices, the most dangerous are present in the sub-mucosa (surface lining) of the esophagus and upper portion of the stomach (fundic portion). Food that is swallowed and forced past these dilated thin-walled veins may cause them to rupture, with a resultant profuse bleeding into the stomach and esophagus.

Heretofore, in the treatment of esophago-gastric varices efforts have been made to tamponade or control bleeding of varices in the region of the lumen of the esophagus and fundic portion of the stomach by use of devices intubated through the nasal passage, pharynx, esophagus and into the stomach. An example of one of the successful devices for the prevention or stopping of bleeding of ruptured varices in the fundic portion of the stomach and the lumen of the esophagus is an esophago-gastric balloon structure of the type developed by R. W. Sengstaken, M.D., and A. H. Blakemore, M.D., both of New York City, New York. The esophago-gastric balloon structure, commonly known as the "Sengstaken-Blakemore" esophago-gastric balloon, includes a tube on which is mounted adjacent one end thereof, an elongated esophageal balloon and a gastric balloon. The tube is provided with separate passageways in its wall, one of its passageways opening to the interior of the esophageal balloon and the other of its passageways opening into the interior of the gastric balloon. Further, the tube is provided with a central passageway which extends through both balloons and has openings in the length of tubing which extends beyond the gastric balloon.

When an esophago-gastric balloon device of the type described above is intubated through the nasal passage and esophagus into the stomach, the gastric balloon will be positioned generally in the fundus or upper portion of the stomach whereas the esophageal balloon is positioned in the lumen of the esophagus. After the device has been positioned in the patient, the esophageal and the gastric balloon are separately inflated and the portion of the tube extending exteriorly of the patient is pulled taut so that the gastric balloon is exerting a pressure on the varices in the fundus of the stomach. The device has heretofore been held in position by application of a cuff of sponge rubber or the like to the tube adjacent to position where the tube emerges from the nostril or it is held in place by taping the tube to the nostril. The portion of the tube extending through the gastric balloon into the lower stomach area is used either to aspirate by suction, blood, gastric juice or bile from within the stomach, or it may be used as a means for feeding the patient and giving medications after the hemorrhage has been controlled.

While the present invention is intended for use in combination with an esophago-gastric balloon device of the type described above and which was developed by Sengstaken and Blakemore it is, of course, within the scope of the present invention that other types of esophago-gastric balloons may be used or the invention may be used with an esophageal balloon by itself or a gastric balloon by itself. If bleeding is occurring in the esophagus, the esophageal pressure alone may stop the hemorrhage, although initially both types of pressures are applied because one cannot determine whether bleeding varices are present within the stomach. The invention is intended to cover such treatment where there is necessity for control of bleeding esophageal and/or gastric varices with said balloons.

An object of the present invention is to provide a system for treatment of esophago-gastric varices or the like, whereby the inflation of the separate esophageal and gastric balloons may be accurately and individually controlled.

A further object of the present invention is to provide a system for treatment of esophago-gastric varices, whereby the inflation pressure of the separate esophageal balloon and the traction presure on the gastric balloon may be accurately maintained and individually controlled.

Another object of the present invention is to provide a system and apparatus for controlling by a measured force the upward pull on a gastric balloon used by itself or in combination with an esophageal balloon.

Still another object of the present invention is to provide a system for accurately controlling, maintaining and measuring the amount of lateral pressure in an esophageal balloon.

Ancillary to the immediately preceding object, it is a further object of the present invention to provide a means for inflating an esophageal balloon with a measured amount of lateral pressure, the measurement of lateral pressure in the esophageal balloon being in the same units that are used to measure the venous pressure in the portal system of a person. Such a measurement has proved very advantageous in that the physician can accurately determine the amount of lateral pressure needed in the esophageal balloon to adequately compress the varices in the lumen of the esophagus, in case of rupture, to thereby stop the flow of blood.

Another object of the present invention is to provide a control system for the inflation of an esophageal balloon, the control system including means to buffer the effect of normal contractions of the esophagus on the balloon so that there will not be large fluctuations in pressure readings, incorrectly interpreting the pressure within the esophageal balloon.

Another object of the present invention is to provide a warning system for an esophago-gastric balloon device which renders the use of the device safer through an automatic signal system should the pressure fall due to some cause.

Still another object of the present invention is to provide a device for use with a gastric balloon capable of applying a continuous pull on the balloon in a predetermined measured amount.

Still another object of the present invention is to provide traction on a gastric balloon, the traction being applied to the tube in spaced relationship to the patient so that pressure necrosis to the patient's nose is completely avoided.

A further object of the present invention is to provide a control means for a gastric balloon with a buffered traction effect when sudden contractions of the diaphragm occur.

A still further object of the present invention is to provide a warning system for the control of an esophago-gastric balloon device which will increase the safety of the patient by immediately indicating a drop in either gastric balloon traction pressure or esophageal balloon inflation pressure, which drop in pressure may permit the occurrence of a concealed and massive hemorrhage resulting in irreversible shock and death before the malfunction of the balloons is otherwise recognized.

These and other objects of the present invention will appear more fully in the following specification, claims and drawings, in which:

FIGURE 2 is a digrammatic view of an esophago-gastric balloon as heretofore used on a patient.

FIGURE 6 is an enlarged fragmentary sectional view of a portion of the headgear unit and showing the means for applying a measured amount of traction on the gastric portion of the esophago-gastric balloon.

FIGURE 7 is a cross-sectional view taken on the line 7—7 of FIGURE 6.

FIGURE 8 is an enlarged sectional view of the tube of the esophago-gastric balloon and is taken on the line 8—8 of FIGURE 3.

FIGURE 9 is an enlarged cross-sectional view of the control device for the esophageal portion of the esophago-gastric balloon and is taken substantially on the line 9—9 of FIGURE 1.

FIGURE 10 is an enlarged fragmentary sectional view taken on line 10—10 of FIGURE 9 and showing communication between the water reservoir and the water column cylinder.

FIGURE 11 is an enlarged fragmentary vertical section of the water column cylinder and showing in elevation the warning switch and the float-operating means for the warning switch.

FIGURE 12 is an enlarged cross-sectional view similar to FIGURE 11 but taken at right angles thereto.

FIGURE 13 is a cross-sectional view taken on the line 13—13 of FIGURE 11.

FIGURE 14 is a schematic view of a simplified wiring diagram for the warning system of the present invention.

Figure 1:
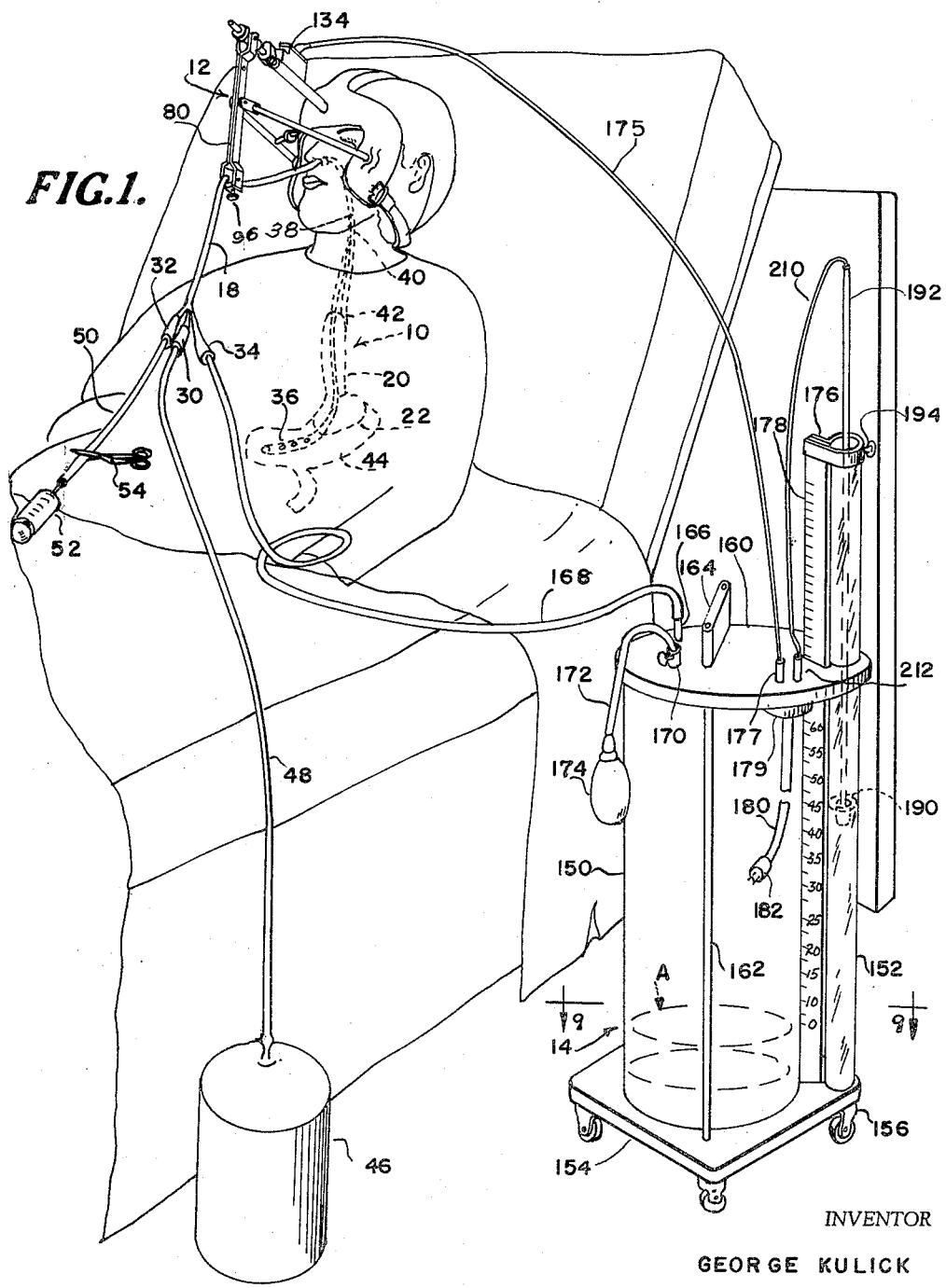
FIGURE 1 is a diagrammatic view of the system of the present invention and showing its use on a patient.

Referring now to the drawings, wherein like characters or reference numerals represent like or similar parts, the pesent invention is disclosed diagrammatically on a patient in FIGURE 1 and includes an esophago-gastric balloon structure or device generally designated by the numeral 10, a headgear device 12 worn by the patient and applying traction to the esophago-gastric balloon structure 10, and an esophageal balloon control unit, generally designated by the numeral 14, for controlling lateral pressure on the esophagus by the esophago-gastric balloon structure 10. The complete operation of the system and function of the apparatus associated with the system will appear more fully later in the specification, after detailed description has been made of the various units.

The esophago-gastric balloon structure 10 is shown for illustrative purposes only as being of the type developed by the aforementioned "Sengstaken and Blakemore." It includes a tube portion 18 carrying adjacent one end thereof an esophageal balloon 20 and a gastric balloon 22. The tube portion of the device is provided with a central passageway 24, as shown in FIGURE 8, and a pair of passageways 26 and 28 in its walls. One end of the tube 18 which extends exteriorly of the patient is provided with three branches 30, 32 and 34, the branches communicating respectively with the passageways 24, 26 and 28. Passageway 26 opens to the interior of the gastric balloon 22, whereas passageway 28 opens to the interior of the esophageal balloon 20. The central passageway 24 extends through both the esophageal and gastric balloons and opens in an end portion 36 of the tube 18.

As is now evident, when the esophago-gastric balloon structure 10 is intubated through the nasal passage 38, pharnyx 40 and esophagus 42 into the stomach 44, as shown in FIGURE 1, it is in a position where the balloons 20 and 22 may be inflated. The lower portion 36 of the tube 18 lies in the stomach and, thus, blood, water or air may be aspirated through the passageway 24, branch 30 to a suction device 46 connected thereto by tube 48. While passageway 24 is illustrated as being used to aspirate the stomach, it may also be used to pass food and medication to the stomach when the condition of the patient warrants the same.

Branch 32 is connected by means of a tube 50 to a syringe 52 shown for illustrative purposes, the syringe providing a suitable source for applying a positive pressure through the branch 32, passageway 26 and into the gastric balloon 22 so as to inflate the same. Once the gastric balloon is inflated to a desired volume, a suitable clamping means, such as the forceps 54 is applied to the tube 50 so as to prevent air from escaping the gastric balloon 22. The esophageal balloon portion 20 of the device 10 is inflated by means of the control unit 14 through the branch 34, passageway 28 to a desired measured pressure as will be explained in more detail later in the specification.

FIGURE 2 illustrates an esophago-gastric balloon structure 10′, which is substantially the same as the balloon structure 10 just previously described. However, in FIGURE 2, the means for providing a traction on the gastric balloon portion 22′ of the structure 10′ is shown as a cuff 23 made of sponge rubber and applied to the tube 18′ after the tube has been pulled taut so that the gastric balloon portion 22′ is substantially contiguous with and applying a pressure to the lining of the fundic portion of the stomach. The cuff 23 is pressed tightly against the nostril and prevents the balloon structure 10′ from slipping downwardly further into the stomach. However, such prior method of applying an upward pull on the gastric balloon 22′ of the structure 10′ has disadvantages in that pressure could not be maintained on the nostril by the cuff 23 for any great period of time or necrosis would set in and, further, such an arrangement did not provide means for applying a measured known amount of pull on the gastric balloon against the fundus. In addition, the prior method of use of the structure 10′ was not capable of compensating for contractions of the esophagus or diaphragm. While the arrangement shown in FIGURE 2 has considerable merit and is a great advancement in the medical profession for treatment of varices in the fundus and lumen of the esophagus, it required strict supervision by physicians and nurses and provided no means for the physician or nurse to know if there has been a failure in the gastric balloon 22′ or if the patient had a concealed and massive hemorrhage.

Figure 3:
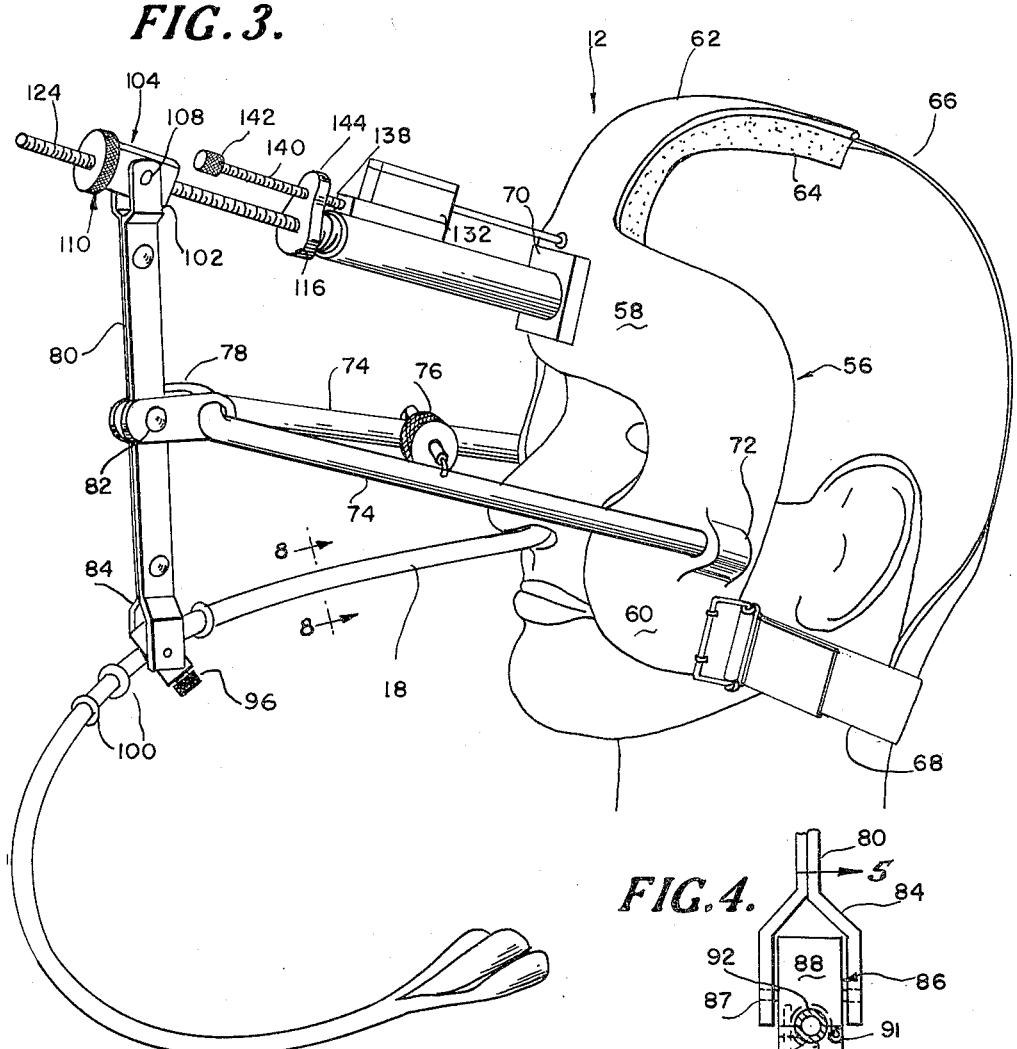
FIGURE 3 is a perspective view of the headgear apparatus for applying traction to the gastric balloon.

Referring now to FIGURE 3, the headgear device 12 of the present invention is adapted to be used with the esophago-gastric balloon structure 10 or with a gastric balloon (Linton balloon) by itself. The purpose of the headgear device 12 is to provide means whereby the gastric balloon 22 can be drawn tightly against the fundic portion of stomach 44 with a measured amount of tension so that it can compress any varices in this area and prevent any further hemorrhage from the rupture site.

More specifically, the headgear device 12 includes a headpiece member 56 which, in its preferred form, includes a forehead plate 58 having downward extensions 60 on each side forward of the patient's ears and for engagement with the cheek areas. Further, the headpiece member 56 includes a curved element 62 extending upwardly from the forehead plate 58 and adapted to fit over the crown of the patient's head. The headpiece member is preferably molded from a plastic material such as polyethylene or the like, and is backed by soft sponge rubber 64 or the like. Suitable adjustment straps 66 and 68 are provided for retaining the headgear device on the patient's head and as shown in FIGURE 3. The strap 66 attaches to the curved element 62 whereas the strap 68 attaches to the downward extensions 60 adjacent to the jaw. Integrally molded on the forehead plate 58 is a boss 70 which is best shown in FIGURE 6. Also, integrally molded on the headpiece 56 in the area where the extensions 60 cover the cheek are bosses 72 (only one shown).

The ends of a yoke-shaped frame member 74 are fixedly attached to the bosses 72 on the side pieces or extensions 60. Between the two arms of yoke-shaped frame member 74 is a turn buckle element 76, the turn buckle element 76 being provided for adjusting the distance between the ends of member 74 and, consequently, the flexible headpiece member 56 in the area of the cheeks of the patient can be adjusted for a particular patient.

Figure 4:
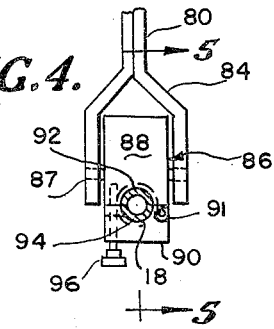
FIGURE 4 is an enlarged fragmentary detailed view of the means of attaching the headgear unit to the portion of the tube of the esophago-gastric balloon which extends exteriorly of the patient as shown in FIGURE 3.
Figure 5:
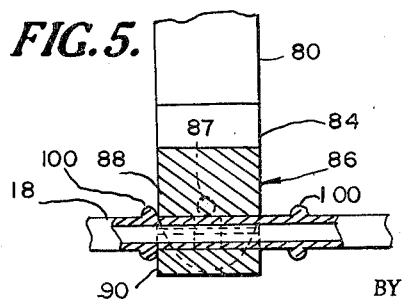
FIGURE 5 is a sectional view taken on the line 5—5 of FIGURE 4.

The outer end of yoke member 74 is provided with a bifurcated support member 78 which pivotally supports a lever 80 as indicated at 82. The lower end portion 84 of lever 82 is bifurcated, as best shown in FIGURES 4 and 5, the bifurcated portion 84 supporting a tube clamping block 86. The clamping block 86, which is pivotally supported as indicated at 87, to the bifurcated portion of lever 80 comprises an upper member 88 and a lower member 90 hinged thereto, as indicated at 91. The members 88 and 90 on their mating surfaces are provided with opposed grooves 92 and 94, respectively, defining a bore which is adapted to receive the tube 18 of the esophago-gastric balloon structure 10. Since member 90 is hinged to member 88 as indicated at 91, a set screw 96, extending through the member 90 and threaded into the member 88, is provided for retaining the member 90 in a clamping position on the tube 18.

As will be evident later in the specification, the tube 18 has molded on its exterior surface in the portion which is exterior of the patient, a plurality of spaced rings 100. The rings 100 are adapted to abut against the block member 86 when the member 90 is in clamping position and thus provide a series of stops for adjusting the headgear device when applying the proper traction to the gastric balloon 22.

The upper end portion of lever 80 is bifurcated as indicated at 102. An adjustment sleeve 104 is pivotally mounted, as indicated at 108, to the bifurcated portion 102 of lever 80. In more detail, and referring to FIGURE 6, an adjustment nut 110 is internally threaded and can rotate freely against sliding sleeve 104.

A tubular member 112 is pivotally connected on a horizontal pivot 114 to the boss 70 provided on the forehead plate 58 of the headpiece member 56. The tubular member 112, which is closed at its end pivoted to the boss 70, is open at its other end and is adapted to receive a plunger member 116. A tension spring 118 is interposed between the closed end of the tubular member 112 and the inner end of the plunger member 116 and is connected, respectively, as indicated at 120 and 122. The outer end of the plunger member 116 is provided with a threaded extension 124 which is adapted to be received within the sliding sleeve 104 and adjustment nut 110 internally threaded.

As is now evident, when the lever 80 is connected to the tube 18, as shown in FIGURE 3, the upper end of the lever 80 is being constantly urged in a direction toward the patient's forehead because of the tension of the tension spring 118 and, thus exerting an upward measured pull on the gastric balloon 22. In order that the physician or nurse may know the exact force applied to the fundic portion of the stomach by the gastric balloon, the plunger 116 is provided with a scale 130 which is graduated in grams from 0 to 2,000. Once the esophago-gastric balloon structure 10 has been intubated into the patient and the gastric balloon has been inflated to a fixed volume (about 300 cc. of air) by the syringe 52 or the like, the clamp member or block 86 is opened so as to receive the tube 18. The block 86 is positioned adjacent the stop ring 100 on the tube 18, giving the approximate gram reading desired. When this adjustment has been made, the adjustment nut 110 can be threaded inwardly or outwardly to provide a fine adjustment for the exact grams of force desired.

The tube 112 is provided with an enlarged portion 132 on its exterior that has a cavity 133 therein defining a housing for a micro-switch generally indicated at 134. The enlarged portion 132 is provided with a longitudinal bore 136 and a switch actuator 138 is adapted to be received in this bore. As clearly shown in FIGURE 6, the switch actuator 138 is threaded at 140 and is provided with a knurled adjustment knob 142 at its outer end. The threaded portion 140 of the switch actuator 138 is threadedly received in an offset portion 144 provided on the outer end of the plunger 116. As shown in FIGURE 6, the end of the switch actuator 138 is nearly touching a switch contact or button 146 of switch 134. When the actuator 136 is in this position the switch 134 is in a normally open position. However, if the lever 80 is pivoted counter-clockwise about the pivot 82, the plunger member 116 moves toward the left of FIGURE 6 and the switch actuator 138 will engage the button 146 and close the switch 134. The switch 134 is used in the warning system for the gastric balloon 22, as will be described in more detail later in the specification, but it will be apparent that by threadedly providing the switch actuator 138 in the threaded offset portion 144 of plunger 116, the switch actuator 138 can be adjusted with respect to the button 146 so that actuation of the switch 134 may be accurately controlled to set off the warning system when there is a predetermined drop in the force being applied to the gastric balloon 22.

Referring now to FIGURES 1, 9, 10, 11 and 12, the esophageal balloon control unit 14 includes a water reservoir 150 which has a relatively large diameter of approximately eight inches and which is enclosed from the atmosphere and a water column cylinder 152 open to atmosphere and having a small diameter of approximately one and three quarter inches. The reservoir 150 and water column cylinder 152 are mounted on a base plate 154 provided with castors 156 so that the unit can be conveniently moved about the hospital. The base plate 154 provides the lower end of both the reservoir 150 and the water column cylinder 152 and, as shown in FIGURE 10, a passageway 158 is provided in the base plate 154, the passageway providing communication between the lower ends of reservoir and the narrower water column cylinder. The upper end of the reservoir 150 is enclosed by a cover plate 160 which is held in sealing engagement therewith by an adhesive, such as cement, and additionally by means of the tie rods 162 extending between the base plate 154 and through the cover plate 160. A clamping member 164 into which the tie rods 162 are threaded, tightly clamps the cover 160 to the water reservoir 150.

A hose fitting 166, extending through the cover plate 160, is adapted to receive a tubular hose 168, the other end of the tubular hose 168 being connected to the branch 34 of the tube 18 of the esophago-gastric balloon structure 10. A second fitting 170, including a manually operable needle valve or the like, is provided in the cover plate 160 and a hose 172 extending therefrom is connected at its other end to a bulbous-type air pump 174. A clamp 176 mounted on the upper end of cylinder 152 is provided for supporting a scale 178 immediately adjacent the transparent water column cylinder 152. The scale 178 has graduations thereon in centimeters of water and, thus, measures a hydro-static force which is the difference between levels of water in the reservoir or tank 150 and the cylinder 152. This unit of measurement is identical with the unit of measurement of venous pressure in the portal system of a patient and, thus, the physician has no difficulty in determining the proper pressure to apply to the esophagus by the esophageal balloon 20.

The reservoir 150 is filled with water to the level indicated at A in FIGURE 1. When the water is at this level, in the reservoir 150, the water level in the water column cylinder 152 is also at this level. After the esophago-gastric balloon structure 10 has been intubated into position, and it is desired to inflate the esophageal balloon 20, the physician merely pumps or squeezes the air pump 174 and, thus, applies a pressure above atmospheric pressure to the surface of the water in reservoir A. This pressure applied to the area above the level of water in the reservoir 150 will also be applied through the tube 168, branch 34, passageway 28 to the esophageal balloon 20. When pressure is applied above the water in reservoir 150, the level of water therein will decrease and the level of water in the water column 152 will increase. The physician will continue applying pressure to the reservoir 150 until the desired pressure is read on the scale 178 by observing the level of water in the cylinder 152. As mentioned, before, this will give the physician knowledge of the exact lateral pressure being exerted by the esophageal balloon 20 on the esophagus and this pressure corresponds with the hydro-static force of the portal system which is measured in the same units of centimeters of water. When a desired hydro-static force has been applied to the esophageal balloon 20, the physician merely closes the pet cock valve 170 and this force will remain substantially constant.

The normal contractions of the esophagus on the balloon 20 or of the diaphragm on the balloon 20 do not cause significant fluctuations of the height of the water in the water column 152, as the large volume area in the reservoir 150 provides a means of buffering such fluctuations. A substantial decrease in the height in the water column will be caused only by an emergency condition which would require immediate attention by the nurse or physician. Stated another way, should the esophageal balloon develop a leak or rupture, thereby causing a precipitous and dangerous drop in balloon pressure, then there would be an appreciable change in level of water in the water column 152. If the balloon merely empties part of its air content due to normal contractions of the esophagus, there would be no significant fluctuation in the column 152, as the air would empty into the large chamber above the water level in the reservoir 150 and would then return to the balloon as soon as the contraction of the esophagus is released.

To further reduce needless nursing supervision, a warning system is provided with a control system for both the esophageal and gastric balloons whereby the nurse does not have to give constant attention to the patient. The warning system, which will now be described in detail, provides for any malfunction of the esophageal balloon 20 and/or the gastric balloon 22.

Referring first to the warning system as associated with the gastric balloon 22, the microswitch 134 has already been described. The micro-switch 134 which is mounted on the headgear 12 is normally open when the gastric balloon 22 is properly inflated but will close when there is a failure in the gastric balloon. A leak or insufficient air volume placed within the gastric balloon initially may allow herniation upward through gastro esophageal junction with a resultant decrease in traction force.

Referring now to FIGURE 14, the microswitch 134 is shown in circuit with a bell or buzzer 171 and, if desired, a warning light 173. In more detail, the microswitch 134 is provided with wires 175 which extend to a jack plug 177 (FIGURE 1). The jack plug 177 plugs into a bus bar 179 mounted for convenience on the cover plate 160 of unit 14. Leads 180 from the bus bar 179 may be provided with a conventional plug 182 that can be plugged into circuit with the bell 171 and/or light 173, suitably positioned in the hospital. As is now evident, the closing of the switch 134 will complete the circuit and the bell and/or the light will give a warning to the physician or nurse that immediate attention is needed.

The warning system for the esophageal balloon 20 includes a mercury switch 190 which is mounted on the lower end of a tubular member 192 supported centrally and vertically in the water column cylinder 152. In more detail, the tube 192 can be adjusted vertically of the water column cylinder 152 by means of an adjustment set screw 194 extending through the clamp 176 and engaging the tube. The mercury switch 190 is carried on a bracket 196 which is pivotally supported between a forked member 202 by means of horizontal extending pivot pins 198. The forked member 202 is fastened to the lower end of adjustable tube 192. Attached to bracket 196 is an eye member 200 through which an arm 206 may pivot at 204. Arm 206 is attached to float 208. The pivot point 204 has a parallel axis to pivot 198 and, thus, when there is a drop of level in the water in column 152, the float 208 will cause the switch to tilt about the pivots 198 and 204 and thereby actuate the switch to a closed position.

Referring to FIGURE 12, it will be seen that the switch 190 is provided with leads 210 which extend upwardly through the tube 192 to a jack plug 212 (FIGURE 1) which is adapted to fit into the bus bar 179. In other words, the switch 190 is substantially in a parallel circuit with the switch 134 and when either the switch 190 or the switch 134 closes, the bell 171 and/or light 173 will give a warning to the physician or nurse that the patient needs immediate attention.

By making the tube 192 vertically adjustable, the physician can adjust the switch and float to a position where the switch will close upon a predetermined drop of lateral pressure in the esophageal balloon 20.

The operation of the system just previously described may be briefly summarized as follows:

A person having varices, which are enlarged and sometimes tortuous veins, in the fundic portion of the stomach or in the esophagus, is treated by first intubating the esophago-gastric balloon structure 10 through one of the nasal passages 38 down through the pharynx 40 into the esophagus and stomach, as shown in FIGURE 1. Once the balloon structure 10 is in position within the esophagus and stomach, the headgear 12 is placed on the patient and the lever 80 is loosely attached to the portion of the tube 18 extending exteriorly of the patient. The physician then inflates the gastric balloon 22 with the syringe 52 to a desired volume of approximately 300 cubic centimeters of air. After the gastric balloon 20 has the proper amount of air therein, the forceps 54 are clamped to the tube 50 so that no air can leak therefrom.

Once the gastric balloon is inflated, the esophageal balloon 20 may be inflated by opening the pet cock valve 170 and pumping on the air pump 174 so as to apply a hydro-static pressure within the reservoir 150. The pressure applied within the reservoir 150 causes the esophageal balloon to fill through the tube 168, and passageway 28 in tube 18. The water column cylinder 152, which is colored for visualization, will have the level of water therein rise when pressure is applied to the area above the water in reservoir 150. The physician, by observation of the rise of level of water in column 152, can determine the rise of hydro-static force in the balloon 20 in centimeters of water, as indicated on the scale 178. When the desired force is reached, the valve 170 is closed.

After the gastric balloon 22 and the esophageal balloon 20 have been properly inflated, the upward force in grams exerted by the gastric balloon on the fundic portion of the stomach can be regulated by clamping the tube 18 to the lever 80 through swivel clamp 86. Since the lever 80 is constantly urged in a direction where a traction is placed on the tube, the physician can read the scale on the plunger 116 and determine in grams of force, the pressure of balloon 22 on the fundic portion of the stomach. If a fine adjustment is needed, after the lever 80 has been clamped about the tube 18 in a desired position, the adjustment nut or knurled knob 110 can be regulated so as to apply either more or less force on the balloon than was made by the original adjustment.

After the proper force in grams has been applied on the fundic portion of the stomach by regulation of the head unit 12, the physician may then adjust the actuation of the micro-switch 134 by adjusting the switch actuator 138. The switch 134 is adjusted to close when there is a drop in traction pressure on the balloon 22 as would happen with herniation of balloon 22 into the esophagus.

The only adjustment remaining is the adjustment of the warning switch 190 in the water column cylinder 152. This is simply done by releasing the set screw 194 and regulating the vertical position of the switch 190 by moving the rod 192 up or down so that upon a predetermined drop in level of liquid in the water column the switch will be actuated to closed position.

While the adjustment of the various units of the system have been described in a particular order, it is, of course, within the scope of the invention that the adjustments may be made in another order without departing from the environment of the invention. Further, it will now be appreciated that if a tampon is desired merely for the fundic portion of the stomach, a gastric balloon by itself may be used, and also, if a tampon is merely needed in the esophagus, then only the esophageal balloon may be used. However, the gastric balloon is needed for the positioning of the esophageal balloon, although no upward traction is used on the gastric balloon.

Having set forth the nature, objects and advantages of the invention, it will also be obvious that the invention is susceptible to some changes and modifications without departing from the principles and spirit thereof. For this reason, the terminology used in the specification is merely for purpose of description and not limitation, the scope of the invention being defined in the claims.

I claim:

1. In a system to tamponade for hemorrhage and the like from esophago-gastric varices: an esophago-gastric balloon structure including a tube and adapted to be intubated into the esophagus and fundus of the stomach, said balloon structure having an esophageal portion inflatable in the esophagus and a gastric portion inflatable in the fundus of the stomach; means to inflate said esophageal and gastric portions of said balloon structure independently of each other; and tension applying and measuring means for applying a constant upward tension at a predetermined measured value on said gastric portion of said balloon structure.

2. In a system to tamponade for hemorrhage and the like from esophago-gastric varices: an esophago-gastric balloon structure including a tube and adapted to be intubated into the esophagus and fundus of the stomach; said balloon structure having an esophageal portion inflatable in the esophagus and a gastric portion inflatable in the fundus of the stomach; means to inflate esophageal and gastric portions in said balloon structure independently of each other; means for applying a constant upward tension at a predetermined value on said gastric portion of said balloon structure; and a signal means operatively connected to said last mentioned means for indicating when tension on said gastric portion of said balloon structure drops below said predetermined value.

3. In a system to tamponade for hemorrhage and the like from esophago-gastric varices: an esophago-gastric balloon structure including a tube adapted to be intubated into the esophagus and fundus of the stomach, said balloon structure having an esophageal portion inflatable in the esophagus and a gastric portion inflatable in the fundus of the stomach; means to inflate said esophageal portion of said balloon structure so as to apply a predetermined lateral pressure on the esophagus; means operable independent of said last mentioned means for inflating the gastric portion of said balloon structure; signal means operatively connected to said pressure control means for said esophageal of said balloon structure, said signal means being operable to indicate when lateral pressure in esophageal portion of said ballon structure drops below said predetermined lateral pressure; means for applying a constant upward tension on said gastric portion of said balloon structure at a predetermined value; and signal means operatively connected to said tension means for indicating when tension on said gastric portion of said balloon structure drops below said predetermined value.

4. In a system to tamponade for hemorrhage and the like from gastric varices: a gastric balloon structure including a tube and adapted to be intubated through the esophagus into the fundus of the stomach; means to inflate the gastric balloon when positioned in the fundus of the stomach; and tension applying and measuring means for applying a measured constant upward tension on said gastric balloon at a predetermined value.

5. In a system to tamponade for hemorrhage and the like from gastric varices: a gastric ballon structure including a tube and adapted to be intubated through the esophagus into the fundus of the stomach; means to inflate said gastric balloon; means for applying a constant upward tension on said gastric balloon at a predetermined value; and signal means operatively connected to said tensioning means for indicating when tension on said gastric balloon drops below said predetermined value.

6. In combination: a tube, a balloon mounted on one end of said tube and adapted to be intubated through the esophagus into the stomach with the other end of the tube adapted to extend exteriorly of the person; means to inflate the balloon through the tube when in the stomach; and tension applying and measuring means connected to said tube exteriorly of the person for applying a predetermined measured pull on the tube so that the balloon has an upward substantially constant force on the stomach in the fundus area of the stomach.

7. In combination: a tube, a balloon mounted on one end of said tube and adapted to be intubated through the esophagus into the stomach with the other end of the tube extending exteriorly of the person; means to inflate the balloon through the tube when in the stomach; and means connected to said tube for applying a predetermined measured pull on the tube so that the balloon has an upward substantially constant force on the stomach in the fundus area of the stomach; said last mentioned means including a headgear, a lever pivotally connected to said headgear, said lever having one end connected to said tube, and spring means operatively connected to said lever for normally urging said lever in a direction for applying a pull on said tube.

8. A combination of claim 7 including means to adjust the amount of force applied by said spring means.

9. A combination of claim 7 including a signal means for indicating when there is a precipitous drop in upward pull on said tube, said signal means including a warning device, a normally open switch in circuit with said warning device, said switch being closed by movement of said lever in a direction tending to withdraw said tube and said balloon from the person.

10. A combination of claim 9 including adjustment means for said switch to determine limits for closing of said switch.

11. A device for use in applying a measurable substantially constant upward pull of predetermined value on a gastric balloon inflated within the fundus portion of the stomach and having a tube extending exteriorly of the person comprising a headgear; a frame structure carried by said headgear and extending forwardly of the same; a lever pivotally connected to said frame structure in spaced relation to the headgear; means adjacent one end of said lever for fixedly connecting said lever to the exterior portion of the tube connected to the balloon, and spring means operatively connected to said headgear and said lever for normally urging said lever in a direction for applying a pull on said tube.

12. A device of the character described in claim 11 including means to control the amount of pull exerted by said spring means on said tube.

13. A device of the character described in claim 11 including a signal means, said signal means comprising a warning device, a switch in circuit with said warning device and carried by said headgear and normally open when said lever of said headgear is applying a pull of predetermined value on the balloon, means carried by said lever for closing said switch when pressure exerted by the balloon on the fundus drops.

14. In an apparatus for controlling lateral pressure in an esophageal balloon of the type having a tube extending therefrom exteriorly of the person: a first reservoir enclosed from atmosphere and having a large cross sectional area and a large volume, a second reservoir having a cross-sectional area relatively smaller than the cross-sectional area of said first reservoir, means to place the lower portion of said first reservoir in communication with said second reservoir; a liquid carried in the lower portion of said first and second reservoirs, means to connect the upper portion of said first reservoir in open communication with the esophageal balloon, means to pump air into the upper portion of said first reservoir to thereby place a pressure on the liquid therein and inflate the esophageal balloon with air, means to measure the pressure in said esophageal balloon, said last mentioned means coacting with said second reservoir to measure a differential of liquid level between said first and second reservoirs when pressure is applied to liquid in said first reservoir, and signal means for indicating a precipitous drop in balloon pressure of the esophageal balloon, said signal means including a warning device, a normally open switch in circuit with said warning device, said switch being positioned within said second reservoir and operable to closed position by a drop in liquid level in said second reservoir.

15. An apparatus of the character described in claim 14 wherein said means for measuring the differential of liquid level of said first and second reservoirs includes a scale positioned adjacent said second reservoir and wherein said second reservoir is made of a transparent material whereby the level of liquid therein is visible.

16. An apparatus of the character described in claim 14 wherein said means for applying pressure to the esophageal ballon includes valve means to prevent leakage of air from said first reservoir.

17. An apparatus of the character described in claim 14 wherein said switch is adjustable vertically of said second reservoir.

18. In an apparatus for controlling lateral pressure in an esophageal balloon of the type having a tube extending therefrom and exteriorly of the person: means connected to said tube for inflating the balloon after it has been intubated into the esophagus, said means including a vertical cylinder provided with water and defining a water column associated therewith and capable of measuring the amount of pressure to which the esophageal balloon is inflated, signal means for indicating a drop in balloon pressure of the esophageal balloon, said signal means including a warning device, a normally open switch in circuit with said warning device, and float means in said water column and operatively connected to said warning switch, said float means actuating said switch when there is a change of level of liquid in said water column.

19. An apparatus of the character described in claim 18 including means to support said switch within said cylinder above the level of water therein, said supporting means being capable of adjusting the vertical position of said switch with respect to said cylinder.

20. An apparatus of the character described in claim 18 including means to buffer pressure changes exerted on said water column by normal contraction of the esophagus on the esophageal balloon, said buffering means preventing actuation of said switch unless there is a precipitous loss of pressure in said esophageal balloon.

21. An apparatus of the character described in claim 20 wherein said buffering means includes a reservoir in open communication at its lower end with the lower portion of said vertical tube, said reservoir being enclosed from atmosphere and partially filled with water, said reservoir further being in open communication at its upper end with said esophageal balloon.

22. In a system for treatment of the stomach: an inflatable balloon carried on the end of a tube and adapted to be intubated through the esophagus into the stomach, means to inflate said balloon when positioned in the stomach and traction means for applying a pull to the tube of said balloon whereby said balloon is pulled upwardly against the fundic portion of the stomach, said traction means including a headgear, and means carried by said headgear for engaging the tube of said balloon in spaced relationship to epithelium and cartilages of the nose.

23. In combination: a tube, a balloon mounted on one end of said tube and adapted to be intubated through the nostril and esophagus into the stomach with the other end of the tube extending from the nostril, said tube having a plurality of spaced annular shoulders thereon, said shoulders being on the portion of said tube extending outwardly of the nostril; means to inflate said balloon when positioned in the stomach; and traction means for applying a pull to the tube whereby said balloon is pulled upwardly against the fundic portion of the stomach, said traction means including a head gear and means carried by said head gear for engaging one of the shoulders on said tube in spaced relationship to the epithelium and cartilages of the nose.

24. A combination of claim 23 wherein said last-mentioned means carried by said head gear includes a lever pivotally connected to said head gear, said lever having a clamping block thereon for clamping about said tube and abutting said one shoulder, and spring means operatively connected to said head gear and said lever for normally urging said lever in a direction for applying a pull on said tube.

25. A combination of claim 23 including a vernier adjustment means for adjusting the amount of force applied by said traction means.

26. In combination: a tube, a balloon mounted on one end of said tube and adapted to be intubated through the nostril and esophagus into the stomach with the other end of the tube extending outwardly of the nostril; means to inflate the balloon through the tube; a headgear; and traction means carried by said headgear for applying a predetermined measured pull on the tube so that the balloon has an upward substantially constant force on the stomach in the fundus area thereof; said last-mentioned traction means including a first adjustment means for applying a pull on the tube approximate to said predetermined measured pull and a second adjustment means for providing a vernier adjustment to the pull on said tube.

27. A combination of claim 26 wherein said first adjustment means includes a plurality of spaced annular shoulders on said tube, said shoulders being on the portion of the tube extending outwardly of the nostril, a lever pivotally connected to said headgear, said lever having one end connected to said tube and abutting one of said shoulders, and spring means connected to said lever for normally urging said lever in a direction for applying a pull on said tube.

28. A combination of claim 27 wherein said second adjustment means includes means operatively connecting said spring means to said lever and adjustably positioning said lever with respect to said spring means.

References Cited in the file of this patent

UNITED STATES PATENTS

| | | | |
|---|---|---|---|
| 150,045 | Hugon | Apr. 21, | 1874 |
| 654,631 | Hays | July 31, | 1900 |
| 793,775 | Esser | July 4, | 1905 |
| 1,134,632 | Nicholson | Apr. 6, | 1915 |
| 1,161,261 | Spalding | Nov. 23, | 1915 |
| 1,858,399 | Jones | May 17, | 1932 |
| 2,687,131 | Raiche | Aug. 24, | 1954 |
| 2,693,191 | Raiche | Nov. 2, | 1954 |
| 2,799,273 | Oddo | July 16, | 1957 |
| 2,845,930 | Brown | Aug. 5, | 1958 |
| 2,854,982 | Pagano | Oct. 7, | 1958 |
| 2,936,760 | Gants | May 17, | 1960 |